(12) United States Patent
Holter et al.

(10) Patent No.: US 7,245,992 B2
(45) Date of Patent: Jul. 17, 2007

(54) AUTOMATIC SELFOPTIMISING AND PRESSURE REGULATED CONTROL UNIT FOR PUMPS

(76) Inventors: Christian Holter, Herrgottwiesgasse 188, A-8055 Graz (AT); Walter Zischka, Herrgottwiesgasse 188, A-8055 Graz (AT); Franz Radovic, Herrgottwiesgasse 188, A-8055 Graz (AT); Franz Lechner, Herrgottwiesgasse 188, A-8055 Graz (AT)

( * ) Notice: Subject to any disclaimer, the term of this patent is extended or adjusted under 35 U.S.C. 154(b) by 0 days.

(21) Appl. No.: 10/902,867

(22) Filed: Aug. 2, 2004

(65) Prior Publication Data

US 2005/0071049 A1   Mar. 31, 2005

Related U.S. Application Data

(60) Provisional application No. 60/492,287, filed on Aug. 5, 2003.

(51) Int. Cl.
*G06F 19/00* (2006.01)
(52) U.S. Cl. ................ 700/300; 700/203; 700/207
(58) Field of Classification Search .......... 700/206, 700/207, 202, 203, 282; 165/209; 62/160; 236/149
See application file for complete search history.

(56) References Cited

U.S. PATENT DOCUMENTS 5,475,986 A * 12/1995 Bahel et al. ............... 62/160
5,544,697 A * 8/1996 Clark ........................ 165/209
6,076,313 A * 6/2000 Pannell et al. ............ 52/169.6
6,167,965 B1 * 1/2001 Bearden et al. ......... 166/250.15
6,663,349 B1 * 12/2003 Discenzo et al. .......... 417/44.1
2003/0236576 A1 * 12/2003 Resnick et al. ............. 700/9
2004/0251017 A1 * 12/2004 Pillion et al. .............. 165/289

* cited by examiner

*Primary Examiner*—Kidest Bahta
(74) *Attorney, Agent, or Firm*—Townsend and Townsend and Crew LLP

(57) ABSTRACT

The invention concerns a new control unit for pumps (3) for heat- and chill-transferring media, which records all parameters for the regulation of the pump in or close to the pump independently from the distance to the heat source (2) or cooling source.

Thus the often complex wiring between heat source (2) and heat sink (1) and/or cooling source and cooling sink is omitted. The control unit may be installed directly on the pump (3) or integrated in the pump consequently.

The controller recognizes self learning due to the evaluation of the operating conditions typical system parameters, so that the positioning of the system-dependent temperature differences for control processes is not necessary and can be omitted.

The construction of the pump (3), integrated controller (4) and sensors (7, 8, 9, 10) close-up range enables a manufacturing of completely pumps prepared for the operation including a controller in extremely compact construction.

10 Claims, 2 Drawing Sheets

AUTOMATIC SELFOPTIMISING AND PRESSURE REGULATED CONTROL UNIT FOR PUMPS

CROSS-REFERENCE TO RELATED APPLICATIONS

Provisional application No. 60/492,287, filed on Aug. 5, 2003.

STATEMENT REGARDING FEDERALLY SPONSORED RESEARCH OR DEVELOPMENT

Not applicable.

BACKGROUND OF THE INVENTION

The invention concerns a control unit for controlling a pump in a heating or cooling circuit.

Up to now pumps are switched on by temperature functions measured by a sensor placed in the heat or cooling source on the one hand and/or in the heat sink (storage, room, . . . ) on the other side. These temperature sensors are often dislocated from the energy source and create need of additional sensor cables. Even if there are solutions that combine physically the location of control and energy source, there are still some sensors external that have to be connected in the building site.

Most control units have to be adjusted manually to find the right operation settings suited for the system. This is a time consuming process when done properly, and often this adjustment is done lousy.

Pressure difference between inlet and outlet is used as a part of the control of pumps for optimising the operating points and to have either constant pressure difference or constant flow.

BRIEF SUMMARY OF THE INVENTION

The new invention concerns a new control unit. It consists of
(1) a controller
(2) a pressure sensor
(3) two temperature sensors The function is based on measuring the pressure difference resulting out of the temperature change in the energy source. This signal creates a "on signal" and after a certain period of waiting time two temperature sensors controlling inlet and outlet temperature take over the speed control or even the switch off signal.

All sensors can be placed in a prefabricated unit as the hydraulic connection transmits the signal of pressure change from anywhere in the system. This prefabricated unit saves time and avoids errors in the installation.

Even more the logic of the control is self optimising and self learning to find the right adjustment suited to the hydraulic system. This self learning process is based on evaluating the performance of ongoing processes and saves the time for finding individual adjustments.

DETAILED DESCRIPTION OF THE INVENTION

Figure 1:
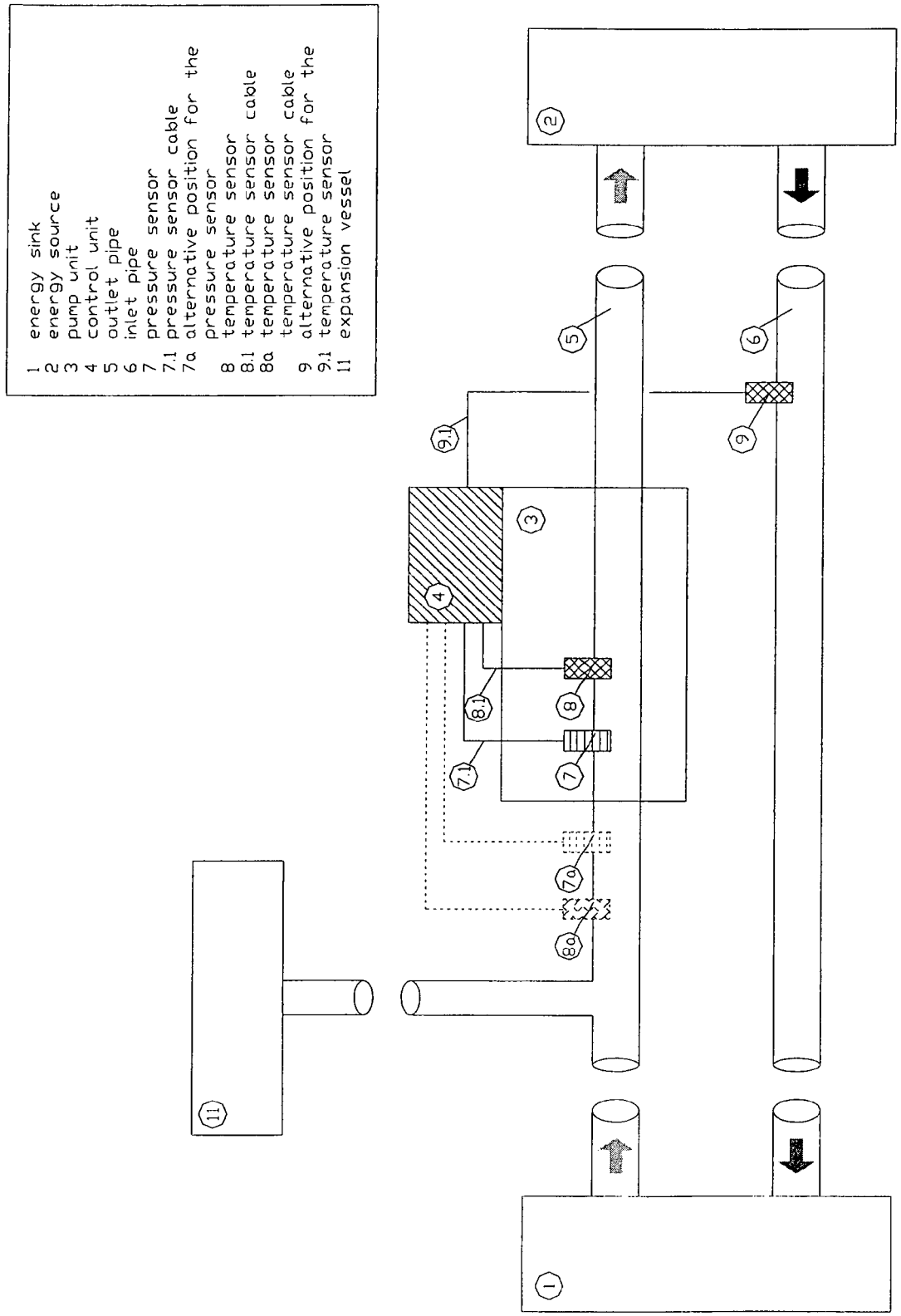
FIG. 1 is an illustrative schematic diagram of a first embodiment of an automatic control unit for circulation pumps in accordance with the present invention.

Referring now to the drawings and more particularly to FIG. 1 shown therein is a first embodiment of an automatic control unit for a circulation pump 3 that is used for the transport of heat or cooling agents. The automatic control unit includes a contoller 4 that recognises the temperature change in an energy source 2 by measuring a pressure chance with a pressure sensor 7, and recognises an inlet temperature and an outlet temperature with two temperature sensors 8 and 9, and transfers the input signals to output to control the pump 3. In FIG. 1 numeral 1 designates an energy sink which is connected to the energy source 2 by means of an outlet pipe 5 and an inlet pipe 6. The pressure sensor 7 is positioned at the outlet pipe 5 and is connected to the control unit 4 by means of a pressure sensor cable 7.1. Numeral 7a designates an alternative position for the pressure sensor 7. The first temperature sensor 8 is positioned at the outlet pipe 5 and is connected to the control unit 4 by means of a temperature sensor cable 8.1. Numeral 8a designates an alternative position for the temperature sensor 8. The second temperature sensor 9 is positioned at the inlet pipe 6 and is connected to the control unit 4 by means of a temperature sensor cable 9.1. Numeral 11 depicts an expansion vessel.

Figure 2:
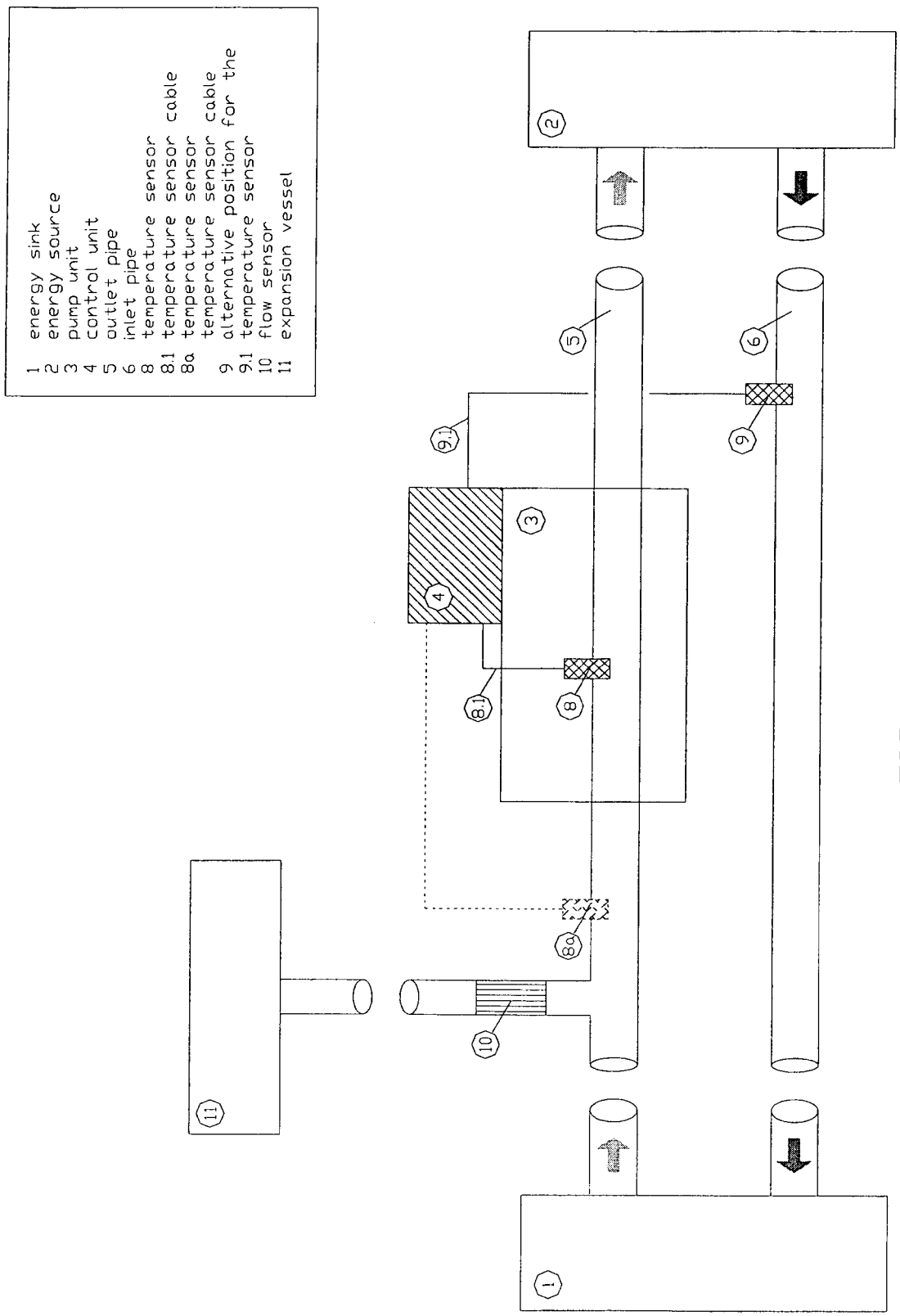
FIG. 2 is an illustrative schematic diagram of a second embodiment of an automatic control unit for circulation pumps in accordance with the present invention.

FIG. 2 shows in an illustrative schematic diagram a second embodiment of an automatic control unit for a circulation pump 3 that is used for the transport of heat or cooling agents. The automatic control unit includes a controller 4 that recognises the temperature change in the energy source 2 by measuring a flow change with a flow sensor 10, and recognises the inlet and outlet temperatures with two temperature sensors 8 and 9, and transfers the input signals to output to control the pump 3. In FIG. 2 numeral 1 designates an energy sink which is connected to the energy source 2 by means of an outlet pipe 5 and an inlet pipe 6. The first temperature sensor 8 is positioned at the outlet pipe 5 and is connected to the control unit 4 by means of a temperature sensor cable 8.1. Numeral 8a designates an alternative position for the temperature sensor 8. The second temperature sensor 9 is positioned at the inlet pipe 6 and is connected to the control unit 4 by means of a temperature sensor cable 9.1. Numeral 11 depicts an expansion vessel.

We claim:

1. An automatic control unit for a pump circulating at least one of a heating agent and a cooling agent between an energy source and an energy sink through an inlet into and an outlet from the energy sink comprising a pressure sensor for detecting a pressure change of the at least one agent, a controller for determining a temperature of the at least one agent from the detected pressure change of the at least one agent, and first and second temperature sensors for sensing a temperature of the at least one agent in the inlet and in the outlet, respectively, the temperature sensors generating corresponding temperature output signals, the controller receiving the temperature output signals and using a difference between them for controlling the operation of the pump after the detected pressure change has reached a pre-established threshold.

2. An automatic control unit according to claim 1 wherein the controller is adapted to activate the pump when a signal from the pressure sensor indicates that the at least one agent has undergone a predetermined temperature change.

3. An automatic control unit according to claim 1 including a mounting place of the pressure sensor which is independent from a location of the energy source and can be connected to a hydraulically connected part of the system.

4. An automatic control unit according to claim 1 wherein the controller is adapted to be placed in or close to the pump.

5. An automatic control unit according to one of claims 3, 4 or 1 wherein all sensors are located close to the pump and are prefabricated with the pump unit including all internal wires.

6. An automatic control unit according to claim 1 wherein the pump is activated in response to a pressure difference resulting from a temperature change in the energy source.

7. An automatic control unit according to claim 1 wherein the controller activates the pump in response to a temperature change in the energy source.

8. An automatic control unit according to claim 1 wherein the controller controls the operation of the pump including its flow rate in response to one of a temperature difference between inlet and outlet and a predetermined temperature of the agent after a specific delay time.

9. An automatic control unit according to claim 1 wherein the controller deactivates the pump when the agent reaches a predetermined maximum temperature in case of heating or predetermined minimum temperature in case of cooling or when no more energy is provided by the energy source.

10. A control unit for heating or cooling an energy sink with energy from an energy source, the hydraulic circuit including an intake into and an outlet from the energy sink, and a pump between the energy sink and the energy source for flowing at least one of a heating agent and a cooling agent in the closed circuit between the energy sink and the energy source, a pressure sensor adapted to determine a pressure of the at least one agent in the hydraulic circuit, first and second temperature sensors for sensing the temperature of the at least one agent in the inlet and the outlet, respectively, and a controller operatively coupled with the pressure and temperature sensors for activating the pump after the pressure sensed by the pressure sensor has reached a level indicative that the at least one agent has reached a predetermined threshold temperature, the controller thereafter controlling the operation of the pump on the basis of temperature-responsive signals generated by the temperature sensors.

* * * * *